United States Patent
Denkewicz, Jr.

(10) Patent No.: US 8,048,316 B2
(45) Date of Patent: Nov. 1, 2011

(54) METHOD AND APPARATUS FOR REDUCING MICROORGANISMS IN WATER

(75) Inventor: Raymond P. Denkewicz, Jr., East Greenwich, RI (US)

(73) Assignee: Zuvo Water, LLC, Mountain View, CA (US)

( * ) Notice: Subject to any disclaimer, the term of this patent is extended or adjusted under 35 U.S.C. 154(b) by 140 days.

(21) Appl. No.: 11/692,638

(22) Filed: Mar. 28, 2007

(65) Prior Publication Data

US 2007/0248488 A1 Oct. 25, 2007

Related U.S. Application Data

(60) Provisional application No. 60/786,449, filed on Mar. 28, 2006.

(51) Int. Cl.
*A61L 2/10* (2006.01)
*C02F 9/00* (2006.01)

(52) U.S. Cl. ............... 210/748.16; 422/186.3; 422/22; 422/24; 422/27; 210/748.01; 210/749

(58) Field of Classification Search ........... 210/748, 210/600, 764, 749, 695, 748.01; 422/22, 422/186.3, 24, 27; 250/533
See application file for complete search history.

(56) References Cited

U.S. PATENT DOCUMENTS

| | | | |
|---|---|---|---|
| 2,970,821 A | 2/1961 | Axt ......................... 261/16 |
| 3,336,099 A | 8/1967 | Czulak et al. .................. 21/102 |
| 3,550,782 A | 12/1970 | Veloz ........................... 210/192 |
| 3,696,932 A | 10/1972 | Rosenberg ..................... 210/437 |
| 3,726,404 A | 4/1973 | Troglione ..................... 210/139 |
| 4,069,153 A | 1/1978 | Gunther ......................... 210/64 |
| 4,141,830 A * | 2/1979 | Last ............................. 210/748 |
| 4,156,652 A | 5/1979 | Wiest ........................... 250/257 |
| 4,176,061 A | 11/1979 | Stopka ........................ 210/63 Z |
| 4,179,616 A | 12/1979 | Coviello et al. ............... 250/527 |
| 4,204,956 A | 5/1980 | Flatow .......................... 210/87 |
| 4,230,571 A | 10/1980 | Dadd ............................... 3/8 |
| 4,273,660 A | 6/1981 | Beitzel ......................... 210/760 |
| 4,274,970 A | 6/1981 | Beitzel ......................... 210/748 |
| 4,323,810 A | 4/1982 | Horstmann .................... 313/24 |
| 4,422,450 A | 12/1983 | Rusteberg ................... 128/62 A |
| 4,437,999 A | 3/1984 | Mayne ......................... 210/748 |
| 4,694,179 A | 9/1987 | Lew et al. ..................... 250/431 |
| 4,752,401 A | 6/1988 | Bodenstein .................. 210/746 |

(Continued)

FOREIGN PATENT DOCUMENTS

DE  3828026  2/1990

(Continued)

OTHER PUBLICATIONS

US 5,159,606, 12/1992, Batchelor (withdrawn).

(Continued)

*Primary Examiner* — Nam Nguyen
*Assistant Examiner* — Cameron J Allen
(74) *Attorney, Agent, or Firm* — Mark J. Danielson; Pillsbury Winthrop Shaw Pittman LLP (57) ABSTRACT

A method for subjecting a microorganism to a combination of ozone and irradiation of UV light which has a synergistic effect on the reduction of the microorganism that may be resistant to either ozone or UV light alone. In particular, *Adenovirus* and *Naegleria fowleri*, are significantly more reduced when subjected simultaneously to the combination of ozone and UV light than when subjected only to ozone or UV light, respectively.

8 Claims, 2 Drawing Sheets

U.S. PATENT DOCUMENTS

| | | | | |
|---|---|---|---|---|
| 4,857,204 | A | 8/1989 | Joklik | 210/695 |
| 4,892,712 | A | 1/1990 | Robertson et al. | 422/186 |
| 4,913,827 | A | 4/1990 | Nebel | 210/748 |
| 4,968,437 | A | 11/1990 | Noll et al. | 210/748 |
| 5,043,079 | A | 8/1991 | Hallett | 1/32 |
| 5,082,558 | A | 1/1992 | Burris | 210/167 |
| 5,106,495 | A | 4/1992 | Hughes | 210/139 |
| 5,106,501 | A | 4/1992 | Yang et al. | 210/266 |
| 5,120,450 | A | 6/1992 | Stanley, Jr. | 210/748 |
| 5,141,636 | A | 8/1992 | Flanagan et al. | 210/209 |
| 5,158,454 | A | 10/1992 | Viebahn et al. | 433/82 |
| 5,178,755 | A | 1/1993 | LaCrosse | 210/195 |
| 5,178,758 | A | 1/1993 | Hwang | 210/256 |
| 5,180,499 | A | 1/1993 | Hinson et al. | 210/706 |
| 5,207,993 | A | 5/1993 | Burris | 422/256 |
| 5,213,773 | A | 5/1993 | Burris | 422/256 |
| 5,230,792 | A | 7/1993 | Sauska | 1/32 |
| 5,266,215 | A | 11/1993 | Engelhard | 210/748 |
| 5,268,104 | A | 12/1993 | Masoomain | 210/638 |
| 5,302,298 | A | 4/1994 | Leitzke | 210/748 |
| 5,352,369 | A | 10/1994 | Heinig, Jr. | 210/760 |
| 5,395,522 | A * | 3/1995 | Melanson et al. | 210/202 |
| 5,431,861 | A | 7/1995 | Nagahiro et al. | 261/140.1 |
| 5,494,576 | A * | 2/1996 | Hoppe et al. | 210/198.1 |
| 5,520,893 | A | 5/1996 | Kasting, Jr. et al. | 422/305 |
| 5,534,156 | A * | 7/1996 | Sanderson | 210/695 |
| 5,540,848 | A | 7/1996 | Engelhard | 210/748 |
| 5,547,590 | A | 8/1996 | Szabo | 210/748 |
| 5,707,594 | A * | 1/1998 | Austin | 422/186.3 |
| 5,709,799 | A * | 1/1998 | Engelhard | 210/748 |
| 5,935,431 | A | 8/1999 | Korin | 210/205 |
| 5,942,125 | A | 8/1999 | Engelhard et al. | 210/748 |
| 6,267,895 | B1 | 7/2001 | Engelhard et al. | 210/748 |
| 6,461,520 | B1 | 10/2002 | Engelhard et al. | 210/748 |
| 6,468,433 | B1 * | 10/2002 | Tribelski | 210/748 |
| 6,491,879 | B2 | 12/2002 | Conrad | 422/186.18 |
| 6,511,594 | B2 | 1/2003 | Shaw | 210/120 |
| 6,511,638 | B2 | 1/2003 | Matsuzaki | 422/186.18 |
| 6,932,903 | B2 * | 8/2005 | Chang | 210/192 |
| 6,982,039 | B1 * | 1/2006 | Butkus et al. | 210/748 |

FOREIGN PATENT DOCUMENTS

| | | |
|---|---|---|
| EP | 0 227 266 | 7/1987 |
| EP | 0 235 315 | 9/1987 |
| EP | 0 237 793 | 9/1987 |
| EP | 0 316 687 | 5/1989 |
| JP | 3-143586 A | 6/1991 |
| JP | 4-141296 A | 5/1992 |

OTHER PUBLICATIONS

Article entitled, "Fountainhead Technologies Talks About Their Unique Approach to Catalytic Water Purification", The Catalyst Review, Nov. 1994, pp. 1, 7-9.

* cited by examiner

METHOD AND APPARATUS FOR REDUCING MICROORGANISMS IN WATER

CROSS REFERENCE TO RELATED APPLICATIONS

The present application is related to and claims priority to a provisional patent application entitled "COMBINED UV RADIATION AND OZONE TREATMENT OF WATER" filed Mar. 28, 2006 and assigned Ser. No. 60/786,449, disclosing an invention by the present inventors.

BACKGROUND OF THE INVENTION

1. Field of the Invention

The present invention relates to a method for disinfecting (microbiological reduction) drinking water or wastewater using an ultraviolet (UV) lamp that generates both UV, for irradiating the water, and ozone for entraining the ozone in the water with a vortex generating apparatus.

2. Description of Related Prior Art

The United States Environmental Protection Agency (USEPA) promulgated the final version of the Long-Term 2 Enhanced Surface Water Treatment Rule (LT2ESWTR) on Jan. 5, 2006. This rule has the goal to reduce the incidence of water-borne disease associated with the protozoan parasite *Cryptosporidium parvum* and other pathogenic microorganisms found in surface waters (USEPA, 2006). In the LT2ESWTR, the USEPA establishes tables that require an ultraviolet (UV) dose of 58 $mJ/cm^2$ for a 1-log (90%) virus inactivation credit, 134 $mJ/cm^2$ for a 3-log (99.9%) credit and 186 $mJ/cm^2$ for a 4-log (99.99%) credit. The USEPA also has provided a draft companion Ultraviolet Disinfection Guidance Manual (UVDGM) (USEPA, 2003), which gives additional recommendations on the design of UV disinfection systems and operation and validation protocols to assure that the required UV doses are achieved reliably. The UVDGM specifies that the actual validated UV dose that a reactor must deliver to achieve conformance with the UVDGM is the target UV dose in the LT2ESWTR table multiplied by a safety factor, which can vary from 1.2 and 3.0 depending on the conditions of the specific validation test, whether or not medium pressure or low pressure UV lamps are used and the specific UV reactor being used.

The UV doses for virus inactivation were derived based on the UV dose response of the adenoviruses, currently the most UV resistant set of pathogenic viruses known, even though many microorganisms, such as hepatitis A virus, rotavirus, and the enteroviruses, are significantly more sensitive to UV than are adenoviruses, as set forth in Table 1.

TABLE 1

UV dose required to achieve 3-log (99.9%) inactivation of a variety of microorganisms (from Yates et al., 2006 and Chevrefils et al., 2006).

| Microorganism | UV dose ($mJ/cm^2$) for 3-log inactivation |
|---|---|
| Adenovirus type 2 | 75-119 |
| Adenovirus type 15 | 122 |
| Adenovirus type 40 | 155 |
| Virus inactivation credit (USEPA, 2006) | 143 |
| Calicivirus bovine | 18 |
| Calicivirus feline | 21-25 |
| Coxsackievirus B3 | 20-27 |
| Coxsackievirus B5 | 20-23 |
| Hepatitis A virus | 12-15 |
| Echovirus | 16-25 |
| Poliovirus 1 | 14-38 |
| Poliovirus Type Mahoney | 14 |
| Rotavirus SA-11 | 23-27 |
| MS2 (Phaage) | 38-57 |
| *Bacillus subtilis* spores | 47-60 |
| *Escherichia coli* O157:H7 | 2.5-4.5 |
| *Legionella pneumophila* | 5-9 |
| *Shigella* spp. | 2 |
| *Salmonella* spp. | 3-15 |
| *Cryptosporidium parvum* | 3-9 |
| *Encephalitozoon intestinalis* microsporidia | 16-18 |
| *Giardia* spp. | 2-6 |

Prior to publication of the LT2ESWTR and UVDGM, a UV dose of 40 $mJ/cm^2$ had been widely accepted in the United States as providing 4-log (99.99%) inactivation of bacteria and viruses. Table 1 indicates that UV doses below 30 $mJ/cm^2$ are generally sufficient for 3-log (99.9%) inactivation of several waterborne viruses, including hepatitis A virus, rotavirus, and poliovirus, while a UV dose below 15 $mJ/cm^2$ would achieve 3-log inactivation of vegetative bacteria. Table 1 also indicates that protozoan pathogens are as sensitive to UV as vegetative bacteria.

The National Sanitation Foundation (NSF) has for many years certified UV drinking water treatment units under their NSF/ANSI Standard 55, which specifies a minimum UV dose of 38 $mJ/cm^2$. Other nations (e.g., Germany and Austria) have since 1994 required validation of UV reactors to achieve minimum UV doses of 40 $mJ/cm^2$. Recently, the NSF amended Standard 55 (to 55A) to require a minimum UV dose of 40 $mJ/cm^2$. Many states (and provinces in Canada) require that UV systems in use in their jurisdiction be certified by the NSF Standard 55A, thereby endorsing (by default) the 40 $mJ/cm^2$ UV dose requirement.

Recent research (see Table 1) suggests, however, that adenoviruses exhibit considerably more UV resistance than the viruses traditionally considered being of significant waterborne concern (e.g., hepatitis A virus, rotavirus, and enteroviruses). Adenoviruses, presently listed on the USEPA's Contaminant Candidate List (CCL) (USEPA, 2005), have been found in recent research to require at least 120 $mJ/cm^2$ and possibly as much as 200 $mJ/cm^2$ or 4-log inactivation (Ballester and Malley, 2004; Gerba et al., 2002; Meng and Gerba, 1996; Nwachuku et al., 2005; Shin et al., 2005; Thompson et al., 2003; Thurston-Enriquez et al., 2003a) (see Table 1). Based on this research, the USEPA adopted a UV dose of 186 $mJ/cm^2$ for a 4-log inactivation credit in the LT2ESWTR. However, assuring a delivered UV dose of 186 $mJ/cm^2$ dose will require applied doses in the 200 to 300 $mJ/cm^2$ range using protocols detailed in the UVDGM, depending on the safety factor required.

Most viruses (particularly the adenoviruses) are quite sensitive to chlorine or chloramines (Ballaster and Malley, 2004). Since the USEPA requires either chlorine or chloramine treatment in the distribution system for surface water drinking water treatment plants, no virus inactivation credits would normally be required if UV disinfection is used with chlorine or chloramine added to provide a residual in the distribution system. There are, however, some surface water systems that will require significant virus disinfection credit, since they currently lack the ability to maintain an adequate free chlorine contact time (CA) for viruses (e.g., systems in agricultural regions where the influent ammonia levels make the use of free chlorine cost prohibitive and systems that have uncovered finished water reservoirs and insufficient contact time between the reservoir and their closest customer's tap).

Other water systems, such as groundwater systems (not subject to the LT2ESWTR), may be significantly impacted by the high UV dose levels for virus inactivation, since many of these systems do not employ chlorine or chloramine treatment following a UV disinfection system. For such systems, no UV dose requirements are currently prescribed in National Primary Drinking Water Standards, hence, states are free to specify the UV doses for groundwater systems in their state. However, it is likely that states will apply the high UV dose values for virus inactivation from the LT2ESWTR and the UVDGM to groundwater systems. The adoption of such high UV dose limits may raise the costs of UV disinfection to the point that utilities using groundwater sources (mostly small communities) will find them uneconomical and this could affect the health of many Americans. For example, the Cadmus Group (2000) found that currently, there are more that 158,000 public ground water systems in the USA. Almost 89 million people are served by community ground water systems, and 20 million people are served by non-community ground water systems. Ninety-nine percent (99%) (157,000) of ground water systems serve fewer than 10,000 people. However, systems serving more than 10,000 people serve fifty-five percent (55%) (more than 60 million) of all people who get their drinking water from public ground water systems.

The threat of water-borne viral infection is not insignificant. Failure to properly protect against viral contamination (e.g., fecal contamination) in drinking water systems (particularly groundwater systems) could lead to disease outbreaks as shown in Table 2.

Table 1 demonstrates that UW disinfection is very effective for bacteria, protozoa and most viruses. However, it is not effective against adenoviruses. On the other hand, Thurston-Enriquez et al. (2005) found that ozone is very effective against adenoviruses. They found that at a Ct value of 0.6 mg/L min can achieve more than 4 logs (99.99%) inactivation of adenoviruses even at 5° C. For example, this could be achieved with a contact time C(t) of two minutes and an ozone residual of only 0.3 mg/L. Thus it appears that a combined ozone and UV treatment system could provide protection for all known pathogenic microorganisms.

TABLE 2

Illnesses Caused by Waterborne Fecal Viral Pathogens

| Enteric Virus | Illness |
| --- | --- |
| Poliovirus | Paralysis |
| Coxsackievirus A | Meningitis, fever, respiratory disease |
| Coxsackievirus B | Myocarditis, congenital heart disease, rash, fever, meningitis, encephalitis, pleurodynia, diabetes, melitis, eye infections |
| Echovirus | Meningitis, encephalitis, rash fever, gastroenteritis |
| Norwalk virus and other caliciviruses | Gastroenteritis |
| Hepatitis A virus | Hepatitis |
| Hepatitis B virus | Hepatitis |
| Small round structured viruses (probably calciviruses) | Gastroenteritis |
| Rotavirus | Gastroenteritis |

TABLE 2-continued

Illnesses Caused by Waterborne Fecal Viral Pathogens

| Enteric Virus | Illness |
| --- | --- |
| enteric adenovirus | Respiratory disease, eye infections, gastroenteritis |
| Astrovirus | Gastroenteritis |

Low pressure UV lamps have two principal emissions at wavelengths of 254 nm and 185 nm, with the latter being about 8% of the intensity of the former. The 254 nm UV light is absorbed by DNA and RNA in microorganisms and leads to their inactivation (by prevention of replication). The 185 nm UV light is blocked by the quartz envelop that is used for most low pressure UV lamps; however, if one uses an envelop made of very pure quartz, it is possible to transmit the 185 nm UV light through into the air surrounding the lamp. Such UV lamps are called "ozone-producing" UV lamps, since the 185 nm UV light is absorbed by oxygen in the air leading to the production of zone. Thus a single UV lamp can produce both germicidal UV light (254 nm) and ozone (185 nm) that could be used for secondary disinfection.

Czulak and Kawchitch (1964) obtained U.S. Pat. No. 3,336,099 which describes an "ozone-producing" UV lamp. Water was treated with a UV disinfection system and ozone produced from the lamp was directed to a separate tank where the ozone dissolved and produced a secondary disinfection effect.

Coviello et al. (1979) obtained U.S. Pat. No. 4,179,616 which describes an improvement on the Czulak apparatus. Ozone produced by the UV lamp to provide secondary disinfection in a separate storage tank in which the ozone was introduced into the water.

Beitzel (1981) obtained U.S. Pat. No. 4,273,660 which describes an apparatus that collects ozone produced from the air surrounding a UV lamp and injects the ozone containing air into the water surrounding the quartz sleeve so that the UV impinges on water than contains ozone from the injection port. The apparatus is described but no results concerning the disinfection effectiveness are provided.

Venosa et al (1984) Disinfection of Secondary Effluent With Ozone/UV, J. Wat. Pollut. Control Fed. 56(2): 137-142. describes a process for treating secondary effluent in a wastewater plant. Ozonated water is subjected to UV light from 14 UV lamps. The disinfection efficiency of the ozone was increased on increasing the UV dose applied. It was determined that disinfection with UV alone was very small and set forth the conclusion that a combined UV/ozone treatment had a considerable synergistic effect.

Wang and Kurylko (1993) obtained U.S. Pat. No. 5,256, 299 which describes an apparatus in which UV light impinges on water in a chamber which is also fed with ozone. The primary purpose of this apparatus is to remove volatile organic compounds from the water. No mention is made of the possible use of UV and ozone together for disinfection.

Korin (1999) obtained U.S. Pat. No. 5,935,431 which describes a treatment similar to that of Czulak and Kawchitch (1964) and Coviello et al. (1979). That is, ozone produced by a UV lamp is used to provide ozone disinfection downstream of the UV reactor.

Amirsardari et al. (2001) Effect on Ozonation And UV Irradiation With Direct Filtration On Disinfection And Disinfection By-product Precursors In Drinking Water Treatment, Environ. Technol. 22: 1015-1023. describes treatment of a raw water source for a drinking water plant first with ozone and then with UV. A reduction of the heterotrophic plate count from 960 to 680 cfu/mL in the ozone disinfection stage and down to 120 cfu/mL in the subsequent UV disinfection stage was found. There is no discussion of an attempt at any simultaneous treatment.

Collivignarelli and Sorlini (2004) AOPs With Ozone And UV Radiation In Drinking Water: Contaminants Removal And Effects On Disinfection Byproducts Formation, *Wat. Sci. Technol.* 49(4): 51-59. describes a study concerning the advanced oxidation treatment of raw surface water using a combined ozone/UV system. It was found that the combined system could effectively remove geosmin and 2-methyl-isoborneol (odiferous compounds) as well as the pesticide metolachlor. The UW doses used were very high (up to 1,400 J/cm2) and no results concerning disinfection were given.

Chang (2005) obtained U.S. Pat. No. 6,932,903 which describes an apparatus in which ozone produced by a UW lamp is injected into the water to be treated which then flows in a spiral fashion around the UW lamp and sleeve, so as to lengthen the contact time of the UW radiation with the ozone-containing water. As with the Wang and Kurylko (1993), no description of the disinfection effectiveness of this apparatus is given.

Chin and Berube (2005) Removal Of Disinfection By-product Precursors With Ozone-UW Advanced Oxidation Process. *Wat Res.*, 39: 2136-2144. describes a combined UW/ozone system for the advanced oxidation treatment of raw surface water to examine the effectiveness of removal of disinfection by-product precursors. A considerable reduction in the levels of disinfection by-product precursors was found; however, the UV doses used (1,610 mW/cm$^2$) were very high.

SUMMARY OF THE INVENTION

The present invention is a method for treating water, particularly groundwater, to achieve microorganism inactivation by simultaneously applying UV radiation and ozone to the water. This treatment of water containing important viral pathogens such as coliphage MS-2, feline calicivirus (FCV), poliovirus, and adenovirus and *Naegleria fowleri* with UV and ozone provides a synergistic effect that produces results which exceed the expected additive benefits of the individual disinfectants. The observed synergistic performance behavior of the combined UV/ozone disinfection process is particularly significant in light of a proposed Ground Water Rule by the USEPA.

In practice, the present invention enables UV disinfection to be used for groundwater treatment even in the presence of adenovirus and *Naegleria fowleri* contamination owing to the contribution of ozone to the overall disinfection process. Furthermore, and importantly, the disinfection synergy exhibited by the simultaneous application of UV light and ozone, coupled with the fact that ozone is made by a UV lamp within the same footprint and of the UV equipment, which allows for compact, reliable and broadly efficacious water treatment.

It is therefore a primary object of the present invention to provide a method of treating water to destroy microorganisms attendant a water source.

Another object of the present invention is to provide a method for treating water simultaneously with ozone and UV light.

Yet another object of the present invention is to provide a method for treating water with ozone and UV light that significantly reduces the UV dose required to effect a 4-log inactivation of viruses.

Still another object of the present invention is to provide a method for treating water with ozone and UV light that significantly reduces the UV dose required to effect a 3-log inactivation of parasitic ($\infty$) cysts.

A further object of the present invention is to provide a method for treating water with ozone and UV light that significantly reduces the UV dose required to affect a 6-log inactivation of bacteria.

A still further object of the present invention is to provide apparatus for achieving a 4-log inactivation of viruses.

A yet further object of the present invention is to provide apparatus for achieving a 3-log inactivation of parasitic cysts.

A still further object of the present invention is to provide apparatus for achieving a 6-log inactivation of bacteria.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

The present invention combines UV light with ozone in a manner that leverages the ability of ozone to readily destroy adenovirus and *Naegleria fowleri* as well as other microorganisms without the many negative attributes of conventional ozone generating systems. The invention is particularly useful when the ozone is generated by UV irradiation, thereby eliminating the need for separate and costly ozone generating equipment. Importantly, it has been discovered that when UV light and ozone are applied simultaneously, a synergistic effect against microorganisms occurs. The implications of the synergistic benefit of the combined disinfectants include:

1. The ability to reduce the UV dose needed to effect a given level of inactivation; in the case of adenovirus, a substantial reduction in the UV dose required to achieve 4-log inactivation was realized.

2. A substantial reduction in the size (i.e., footprint) and cost of the required UV generating equipment needed to treat a given flow rate of water. A reduction in the footprint of a plant is beneficial in urban environments where space is a premium. Furthermore, a reduction in the required capital investment is always a welcomed benefit, irrespective of the technology employed.

3. A broadening in the range of microorganisms for which the system is effective. It is well known that certain microorganisms may be readily defeated by one type of disinfectant while they may have resistance to another type of disinfectant (e.g., chlorine vs. UV with respect to *Cryptosporidium*; UV vs. ozone with respect to adenovirus). Hence, a multi-barrier approach almost always offers greater breadth of disinfection efficacy even if the multiple disinfectants are only additive in their effectiveness.

4. A lowering of the overall energy consumption needed to achieve a given level of efficacy.

Figure 1:
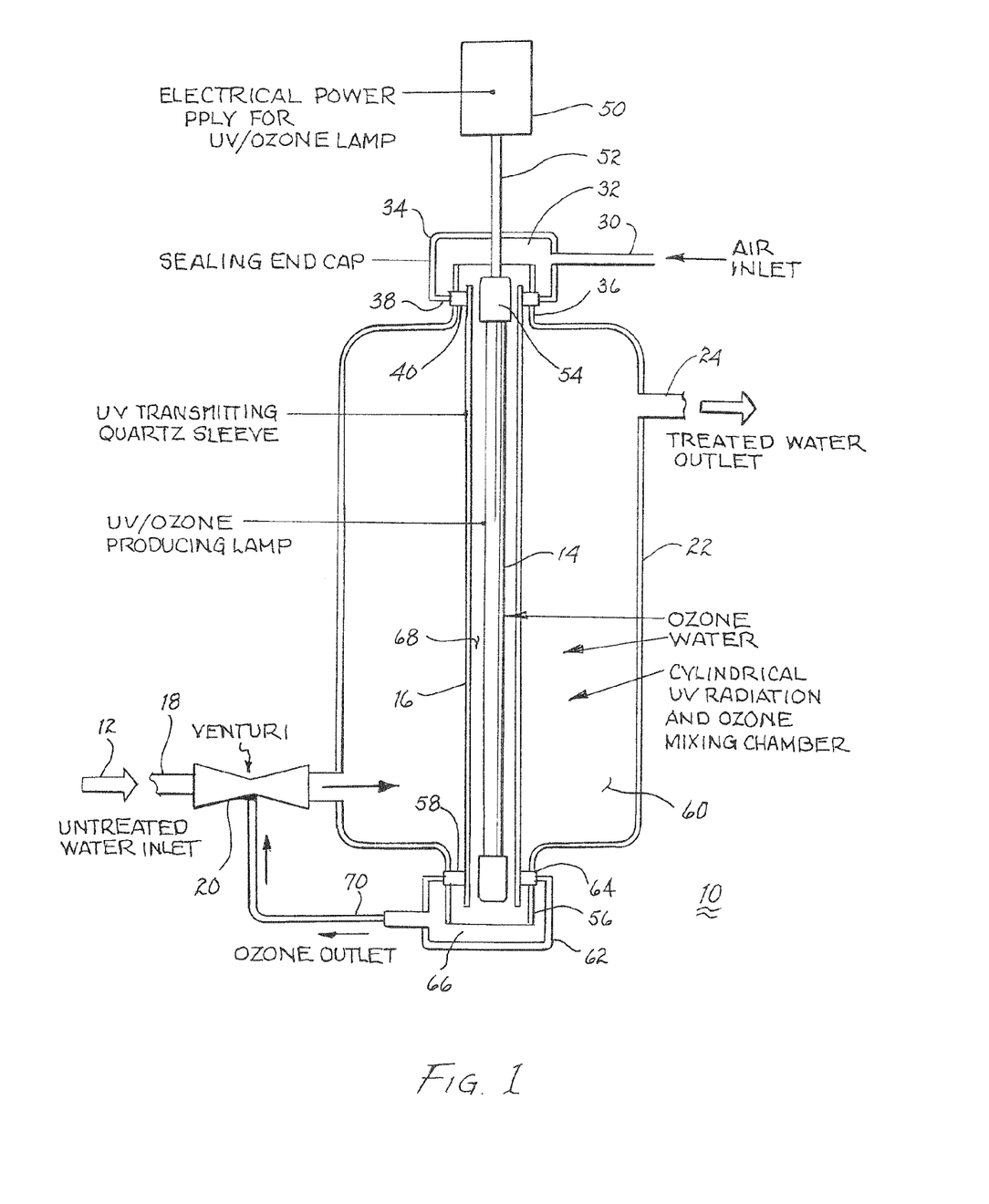
FIG. 1 illustrates apparatus combining UV radiation and ozone entrainment for treating microorganisms in water.

FIG. 1 illustrates a functional representation of an apparatus 10 for carrying our the methodology of the present invention. The apparatus is intended for use with an influent water stream 12, substantially free of turbidity. Under actual use, a UV source 14, surrounded by a sleeve 16 that is capable of transmitting both UV254 (i.e., 254 nm wavelength) as well as UV 185 (i.e., 185 nm wavelength), such as ultra-pure fused quartz, produces ozone from the air that occupies the space (68) between the UV source and the sleeve. Those skilled in the art will recognize that the air in the space between the sleeve and the UV source can be pure oxygen (100% $O_2$) instead of air (21% $O_2$) to provide for a higher ozone output. The gas (i.e., air, oxygen) surrounding the UV source also serves to enhance ozone generation.

Water 12 entering apparatus 10 through conduit 18 is injected with ozone gas via a venturi 20, gas sparger or other known methods in the art. Those skilled in the art will recognize that methods, such as baffle arrangements, exist to aid in better mass transfer (i.e., dissolution) of the ozone gas into the water. The water entering vessel 22 can be injected at a tangential angle to the vessel's vertical axis to create a "vortex" action around sleeve 16. This flow arrangement serves to improve the mixing and homogeneity of the water exposed to the UV light. The vortex action around the sleeve may provide a mechanical abrasion that prevents "fouling" of the sleeve which otherwise would reduce the sleeve's UV transmissive properties; moreover, water passing upward through vessel 22 might otherwise reduce the sleeve's UV transmissive properties.

Water passing upward through vessel 22 is exposed to both UV 254 and UV 185. Those skilled in the art will recognized that UV 254 provides germicidal action as well as conversion of ozone to hydroxyl radicals, whereas UV185 converts oxygen molecules to ozone molecules and creates hydroxyl radicals in water via photolysis of water. The photolysis action around sleeve 16 may provide a chemical cleansing that prevents "fouling" of the sleeve which otherwise would reduce the sleeve's UV transmissive properties. Water exiting vessel 22 through conduit 24 may optionally be treated with a filter (not shown) and/or with catalysts (not shown) for destroying the ozone prior to exiting the vessel. In some applications, the removal of ozone may be required depending on downstream equipment or user preferences. Post filtration treatment with UV light can also be employed to address any potential microorganism "bleed through" from the filter.

It should be recognized that the residence time of the ozone in the water can be quite short (seconds to minutes). This is because the ozone is injected directly into vessel 22 and the residence time of the water in the vessel itself may be short. Additionally, the residence time of the ozone in the water can be quite short because the zone is being readily converted to hydroxyl radicals by the exposure to UV 254. In any event, the maximum benefit to be expected from the ozone as a disinfectant would be its concentration (C) times its residence time (t) in the water. Those skilled in the art will recognize that the disinfection capability of ozone is based on its Ct values for different organisms. Likewise the disinfection capability of UV is based on a total UV light dose. The UV dose applied to the water can be controlled by the selection of the UV light source, its operating parameters (e.g., current) and the residence time. Synergy between the ozone and the UV light will be said to exist if the observed inactivation of microorganisms exceeds the sum of the individual contributions of the UV light.

Further details of apparatus 10 will be described below. The air or other oxygen containing gas enters the apparatus through conduit 30 into a plenum 32 defined by cap 34 sealingly secured to neck 36 of vessel 22. This seal is representatively presented by ring 38. An annular insert 40 is disposed between neck 36 and sleeve 16 to support the sleeve. A source of electrical power 50 provides the requisite electrical power to UV lamp 14 through electrical conductor 52 and socket 54.

Vessel 22 may include a further neck 56 disposed at its lower end. A further annular insert 58 is disposed intermediate neck 56 and sleeve 16 to support the sleeve. It is to be understood that inserts 40 and 58 provide a water tight seal to prevent water 60 within the vessel from draining therethrough. A cap 62 is in sealing engagement with neck 56 through ring 64. The cap defines a plenum 66 for receiving ozone enriched gas flowing from space 68 intermediate UV lamp 14 and sleeve 16. A conduit 70 conveys ozone enriched gas from within plenum 66 to the inlet of venturi 20. The low pressure environment within the venturi will tend to draw the ozone enriched gas into the venturi for entrainment with the stream of water 12 flowing therethrough. In the event the oxygen containing gas introduced to apparatus 10 is under pressure, flow into the venturi will be enhanced.

Figure 2:
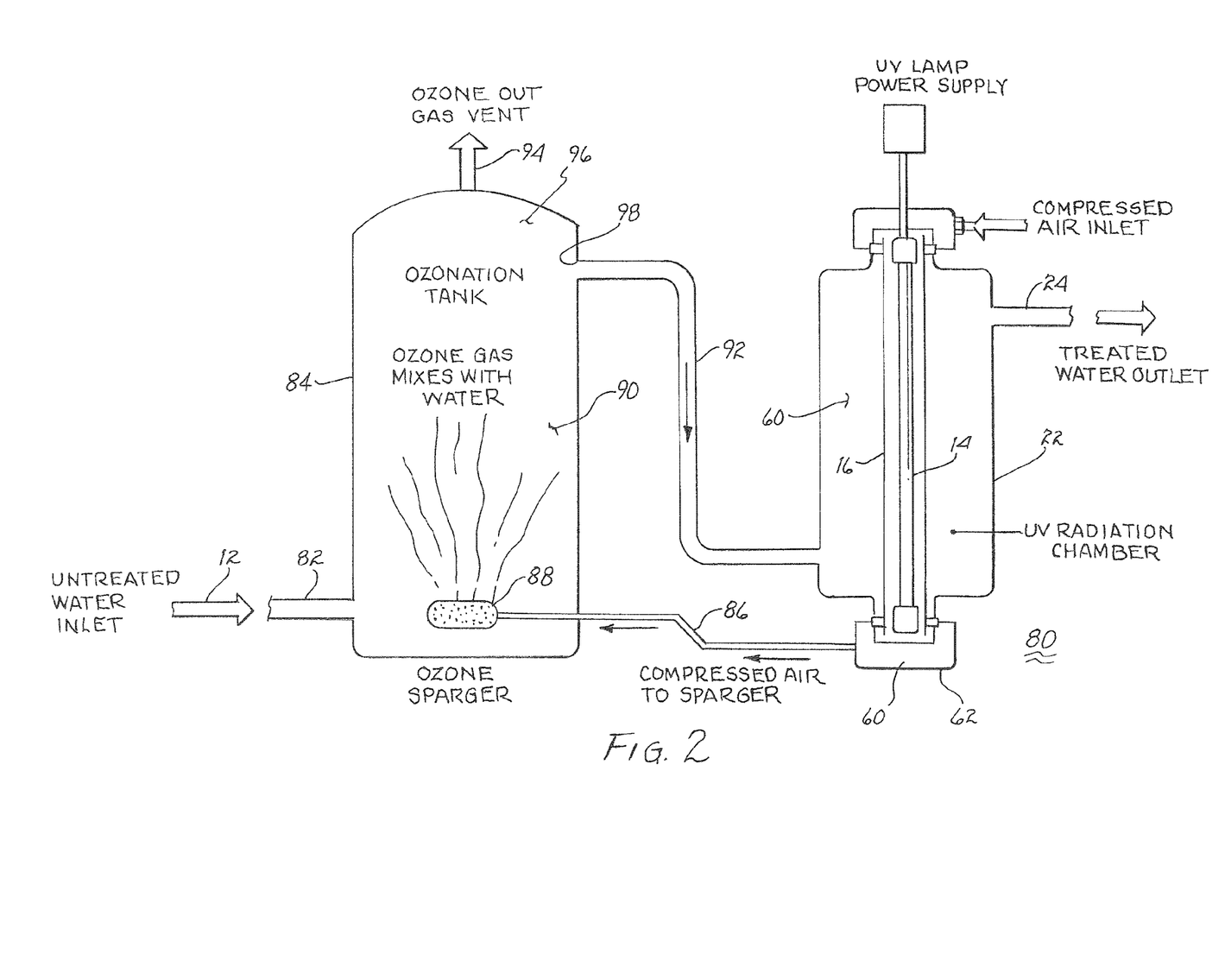
FIG. 2 illustrates apparatus for injecting ozone into water prior to irradiation of the water with UV light.

FIG. 2 illustrates a variant 80 of apparatus 10. As there are common elements illustrated in FIGS. 1 and 2, common reference numerals will be used to identify these elements. Ozone, generated within sleeve 16 in vessel 22 is conveyed from plenum 62 through conduit 86 to sparger 88 disposed in water 90 within tank 84. Outflow of ozone enriched gas from the sparger will become entrained with the water in the tank. Water 12 to be treated enters through conduit 82 and flows into tank 84 for entraining ozone therein. Water in the tank travels upwardly and exits through a conduit 90. This conduit conveys the water with entrained ozone into vessel 22. A vent 94 vents any ozone enriched gas that may collect in space 96 above water 90. By insuring that inlet 98 is below space 96, no ozone enriched gas (unless it is entrained in water 90) will flow into conduit 92.

The ozonated water from tank 84 entering vessel 22 is now exposed to UV light. As before, UV source 14 emits at least both UV 254 and UV 185 through sleeve 16 which is transmissive to both wavelengths. The UV light transmittal through sleeve 16 irradiates the water flowing about the sleeve and the remaining water in vessel 22. Again, a vortex flow pattern of the water in vessel 22, as well as in tank 84, may be used to enhance irradiation of the water.

Referring to both FIGS. 1 and 2, it is self-evident to those skilled in the art that UV source 14 may be any number of UV generating lamps, whether they are standard low-pressure (SLP), Low Pressure High Output (LPHO), or medium pressure configurations. The selection of a particular lamp is determined based on the UV flux required and furthermore, the specific electrical power that can be accommodated based on the UV flux required and the specific electrical power that can be accommodated for a given application. Medium pressure lamps, for example, have a much greater specific UV flux, but their electrical power is also much greater and their efficiency is lower due to a broader range of wavelengths that are emitted.

It is also self-evident that the ozone generated by UV source 14 comes at virtually no capital cost, maintenance cost or equipment footprint penalty. In fact, integrating the UV source and ozone generator within a single assembly (vessel 22) has the benefit of significantly reducing the overall system size, weight, power and, most importantly, cost.

The USEPA (USEPA, 1999a) has estimated the cost to retrofit an existing 1.8 Million Gallon per Day municipal treatment plan with a UV system to be $129,633, whereas for the same size plant an ozone system would cost $884,972. For at least this reason, municipal water treatment plants have more readily adopted UV processing over ozone treatment to meet their water quality requirements. The high cost of ozone treatment stems from a high voltage electrode-based process that generates ozone from dehumidified air by "corona discharge". The present invention eliminates this high cost of ozone generation, while maintaining all of the benefits attendant ozone entrainment.

EXAMPLES

The synergy of UV light and ozone in microbial inactivation is illustrated in the following experiments:

Example 1

Test Organism: MS-2

Propagation and assay of MS-2 coliphage was performed in accordance with Thurston-Enriquez et al. (2003a). Expected UV inactivation was derived from the work of Thurston-Enriquez et al. (2003a). In that paper, the UV dose for 90%-99.99% inactivation for MS-2 coliphage is shown in Table 3 below.

TABLE 3

UV doses for 90% to 99.99% inactivation of test viruses in BDF water and groundwater at room temperature (from Thurston-Enriquez et al. (2003a)).
UV dose (mJ/cm$^2$) for inactivation level

| Virus | Water Type | 90% | 99% | 99.9% | 99.99% |
|---|---|---|---|---|---|
| MS-2 phage | BDF[b] | 23 | 55 | 87 | 119 |
| Feline calcivirus | BDF[b] | 6 | 16 | 26 | 36 |
|  | Ground[a] | 5 | 13 | 21 | 29 |
| Adenovirus | BDF[b] | 50 | 109 | 167 | 226[c] |
|  | Ground[a] | 53 | 103 | 153 | 203[c] |

[a]Ground, treated (de-chlorinated) groundwater
[b]Buffered demand-free water
[c]Extrapolated value, not achieved in bench-scale experiments, based on linear regression.

Ozone was generated by a corona discharge generator and injected into 4 L of dechlorinated tap water at room temperature and pH 7.6. The water was raised and maintained to an Oxidation Reduction Potential (OR) of 400 mV. On addition of the MS-2 to a concentration of $3.3 \times 10^7$ pfu/mL, the OR was maintained at 400 mV for five minutes. At the five minute mark, samples were drawn for MS-2 assay and the water was pumped through a UV (low pressure, high output UV lamp 14) at two gallons per minute. The UV dose was calibrated and known to be 12 mJ/cm$^2$. Following UV treatment, samples were taken for MS-2 assay. A duplicate trial was performed. The results are shown in Table 4:

TABLE 4

Results of ozone and UV disinfection of MS-2 phage

| Trial No. | Ozone Level (OR)/ exposure time (min) | UV Dose (mJ/cm$^2$) | log Inactivation |
|---|---|---|---|
| 1 | 400/5 | 0 | 1.06 |
| 1 | 400/5 | 12 | 3.05 |
| 2 | 400/5 | 0 | 1.00 |
| 2 | 400/5 | 12 | 3.07 |

Based on the results, it would appear that the ozone treatment was responsible for 1-log of MS-2 inactivation and the UV treatment was responsible for about 2-logs of inactivation. However, this should not be the case since the literature clearly agrees that the UV dose required to achieve 2-logs of inactivation of MS-2 is about 40 mJ/cm$^2$ (Chevrefils et al., 2006). From Table 4 above, the applied UV dose of 12 mJ/cm$^2$ should not even have contributed a 1-log inactivation (extrapolation gives about 0.5 logs). Hence, the expected result, based on an additive effect between the UV and ozone, would have been:

Ozone(1-log)+UV(0.5 log)=1.5 log inactivation

The astounding result of 3-log inactivation is suggestive of a synergy between the ozone and UV components.

*Naegleria* is an ameba commonly found in the environment, in water and soil. Only one species of *Naegleria* has been found to infect humans, *Naegleria fowleri*. *Naegleria fowleri* is found worldwide. Most commonly, the ameba is found in warm bodies of fresh water, such as lakes, rivers, hot springs, warm water discharge from industrial plants, in under-chlorinated swimming pools and in soil. Infection with *Naegleria* is most common during the dry, summer months, when the temperature is above 80° F. and the water is warm and water levels are low.

Although *Naegleria* is commonly found in the environment, infection occurs rarely. Only 24 infections were documented in the U.S. between 1989 and 2000. Infection with *Naegleria* occurs when the ameba enters the body through the nose while the person is swimming underwater or diving. The ameba then travels to the brain and spinal cord.

Infection with *Naegleria* causes the disease primary amebic meningoencephalitis (PAM), a brain inflammation, which leads to the destruction of brain tissue. Initial signs and symptoms of PAM include headache, fever, nausea, vomiting and stiff neck. As the ameba causes more extensive destruction of brain tissue, this leads to confusion, lack of attention to people and surrounds, loss of balance and bodily control, seizures and hallucinations. The disease progresses rapidly and infection usually results in death within three to seven days. Several drugs are effective against *Naegleria* in the laboratory; however, although a variety of treatments have been used to treat infected persons, their effectiveness is unclear since most infections have still been fatal. Prompt diagnosis and treatment may help. Fortunately, *Naegleria* infection cannot be spread from person to person contact.

An infection with *Naegleria* can be prevented by not swimming or jumping into bodies of warm fresh water, avoiding swimming in thermally polluted water (water around power plants) and not swimming in areas posted as "no swimming". To avoid inflow of possibly polluted water, hold the nose shut or use nose clips when jumping or diving into bodies of fresh water. Moreover, one cannot get *Naegleria* infection from a swimming pool as long as the pool is properly cleaned, maintained and chlorinated.

While infections are rare, *Naegleria* causes death in about 98% of the cases. Thus, prevention of infection is of paramount importance. *Naegleria* is both UV and Chlorine resistant but fortunately it is not ozone resistant. *Naegleria* is ubiquitous in groundwater in Arizona. Even though little testing has been done in areas outside of Arizona, it is suspected that *Naegleria* will be found in other locales, too. By comparison, Adenovirus is highly UV resistant but not chlorine or ozone resistant.

Because *Naegleria fowleri* and Adenovirus are potentially fatal and found in many sources for drinking water, the following tests were conducted. In the following experiments, apparatus 10 shown in FIG. 1 was used. It was capable of processing 2 liters per minute of water. To study the effects of UV light only, the ozone generated by the apparatus was diverted away and not injected into the water stream. The UV dose (mJ/cm$^2$) was previously calibrated and found to be approximately 48 mJ/cm$^2$ as determined by MS-2 coliphagae biodosimetry. To study the effects of ozone only, the UW lamp was shrouded with a stainless steel sleeve to prevent any water from being exposed to the UW light from lamp 14. The ozone dose was measured in all cases to be about 0.08 mg/L. To study the combination of UV light with the ozone, the ozone was injected at the base of vessel 22 via a venturi as previously described.

Log Reductions in microorganisms were calculated as follows:

Log 10 Reduction=$\text{Log}_{10}$[Final titer]−$\text{Log}_{10}$[Initial titer]

Test for Destruction of *Naegleria fowleri*:

A pure culture of *Naegleria fowleri* (ATCC #30462) was maintained in Nelson's medium. Prior to disinfection experiments, trophozoites were harvested after five days of growth in medium. Cysts were harvested by addition of 0.01% sodium dodecyl sulfate (SDS) to induce the encystment of the trophozoite culture of *Naegleria fowleri*.

The amebas were washed and centrifuged twice with demand free 0.01M phosphate buffer (pH 7.5; 3.8 mM $Na_2HPO_4$, 6.5 mM $KH_2PO_4$). Centrifugation was done at 1090×g for ten minutes.

The concentration of amoebas was determined using a Haemocytometer.

*Naegleria fowleri* was added to de-chlorinated tap water. The assay showed that the *Naegleria fowleri* inoculated water had an initial protozoa titer of 2.42×10$^3$ cysts/mL. The *Naegleria fowleri* inoculated water was processed at 2 L/minute and treated with either UV light (Ex. 2), ozone (Ex. 3) or the combination of UV and ozone (Ex. 4).

Water samples were neutralized immediately after collection with 10% Sodium thiosulfate ($Na_2S_2O_3$). Samples were centrifuged (1,090×g) and appropriate 10-fold serial dilutions were made with Page's Ameba Saline. Viability of *Naegleria fowleri* was observed by using an adaptation of the Most Probable Number (MPN) method from the Standard Methods of Analysis for Water and Wastewater:

a. 2 ml of Nelson's medium was added to each well of a 24-well tissue culture plate.
b. 1 ml of each sample dilution was added in triplicate to wells containing Nelson's medium and plates were then incubated at 37° C. Culture plates were observed for growth of amoebas up to six days using an inverted microscope.

The concentration of amoebas/cysts per ml was calculated by counting the number of positive-growth wells for each dilution.

| Example | Treatment | Initial Titer | Final Titer | $\text{Log}_{10}$ Reduction |
|---|---|---|---|---|
| 2 | UV Light | 2.42 × 10$^3$/mL | 1.16 × 10$^3$/mL | 0.32 |
| 3 | Ozone | 2.42 × 10$^3$/mL | 4.73 × 10$^2$/mL | .071 |
| 4 | UV/Ozone | 2.42 × 10$^3$/mL | 5.27 × 10$^1$/mL | 1.66 |

It is noteworthy that the simultaneous application of ozone and UV resulted in a synergistic effect; that is, 1.66 log >(0.32+0.71). Since it is well established that both UV light and ozone efficacy is directly proportional to dose applied, to have achieved the same result with UV light alone would require approximately five times more UV energy (i.e. 1.66/0.32=5.1). To have achieved the same result with ozone alone would require approximately 2.3 times the ozone dose (i.e. 1.66/0.71=2.33). Clearly, the presence of ozone reduced the UV dose required to achieve a given level of microbial inactivation. Alternatively, it can be said that the presence of UV light reduced the ozone dose required to achieve a given level of microbial inactivation.

Adenovirus 2 (ATCC# VR-846) was obtained from the American Type Culture Collection. It was maintained on PLC (Primary Liver Carcinoma, ATCC# CRL-8024) cell line monolayers with MEM (Minimal essential Medium modified with Earle's salts) containing 2$ FBS (Fetal Bovine Serum) at an incubation temperature of 35° C. with 5% $CO_2$. Viruses were purified by centrifugation (7756×g) to remove cell debris followed by polyethylene glycol (9% PEG, 0.5 mol/L NaCl) precipitation. Viral titrations were performed using the Reed-Muench method to determine the tissue culture infectious dose that affected 50% of the cultures ($TCID_{50}$).

Adenovirus was added to de-chlorinated tap water. The assay showed that the Adenovirus inoculated water was processed at 2 L/minute and treated with either UV light (Ex. 5), ozone (Ex. 6) or the combination of UV and ozone (Ex. 7). Serial 10-fold dilutions of the virus samples were assayed in 24-well tissue culture plates containing monolayers of PLC cells and MEM containing 2% FBS with incubation at 35° C. with 5% $CO_2$ as before. Twelve wells were inoculated with each dilution. Each well was then checked every day for 12 days. Wells were considered positive for Adenovirus 2 if they exhibited characteristic cytopathogenic effects (CPE). The greatest dilution at which more that 50% of wells were positive was used to determine the $TCID_{50}$,

| Example | Treatment | Initial Titer | Final Titer | $\text{Log}_{10}$ Reduction |
|---|---|---|---|---|
| 5 | UV Light | 1.33 × 10$^6$ $TCID_{50}$/ml | 4.50 × 10$^3$ $TCID_{50}$/ml | 2.47 |
| 6 | Ozone | 1.33 × 10$^6$ $TCID_{50}$/ml | 2.08 × 10$^5$ $TCID_{50}$/ml | 0.81 |
| 7 | UV/Ozone | 1.33 × 10$^6$ $TCID_{50}$/ml | 5.02 × 10$^1$ $TCID_{50}$/ml | 4.42 |

It is noteworthy that the simultaneous application of ozone and UV light resulted in a synergistic effect; that is, 4.42 log >(2.47+0.81). Since it is well established that both UV light and ozone efficacy is directly proportional to dose applied, to have achieved the same result with UV light alone would require approximately 1.8 times more UV energy (i.e. 4.42/2.47=1.8). To have achieved the same result with ozone alone would require approximately 5.5. times the ozone dose (i.e. 4.42/0.81=5.5). Clearly, the presence of ozone reduced the UV dose required achieve a given level of microbial inactivation. Alternatively, it can be said that the presence UV light reduces the ozone dose required to achieve a given level of microbial inactivation.

I claim:

1. A method for reducing the viability of *Naegleria fowleri* in water, said method comprising:
    a) irradiating water containing *Naegleria fowleri* with UV light from a UV lamp, wherein the UV light includes at least UV 185 and UV 254;
    b) providing a flow of oxygen-containing gas around the UV lamp within an UV transmissive sleeve surrounding the UV lamp, thereby converting oxygen molecules in the gas within the sleeve to ozone molecules to form an oxygen enriched gas; and
    c) simultaneously with the irradiation with the UV light including at least UV 185 and UV 254 through the UV transmissive sleeve, subjecting the *Naegleria fowleri* to ozone by entraining the ozone enriched gas in the water.

2. The method as set forth in claim 1, including the step of introducing the water containing the *Naegleria fowleri* into a vessel and causing the water to flow past the UV lamp radiating UV light into the water.

3. The method as set forth in claim 2, including the step of collecting the ozone enriched gas and the step of entraining the ozone enriched gas in the water flowing into the vessel during exercise of said step of introducing.

4. A method for reducing the viability of a microorganism that may be resistant to either ozone or UV light by simultaneously exposing the microorganism to both ozone and UV light, said method comprising the steps of:
   a) introducing water containing the microorganism into a tank;
   b) conveying water from the tank to a vessel;
   c) energizing a UV lamp within the vessel to irradiate the water within the vessel with UV light and subject the microorganism in the water to irradiation with UV light;
   d) developing an ozone enriched gas within a sleeve surrounding the UV lamp by urging a gas containing oxygen molecules through the sleeve and about the UV lamp, wherein the sleeve is transmissive of UV light including at least UV 185 and UV 254;
   e) further conveying the ozone enriched gas to the tank;
   f) venting an excess portion of the ozone enriched gas from the tank; and
   g) entraining the ozone enriched gas in the water in the tank to subject the microorganism to the ozone enriched gas in the water in the tank and subsequently in the vessel to ozone molecules while simultaneously irradiating the water with UV light having at least UV 185 and UV 254.

5. Apparatus for reducing the viability of a microorganism in water that may be resistant to either UV radiation or ozone, said apparatus comprising in combination:
   a) a vessel for receiving the microorganism containing water;
   b) a UV lamp for irradiating the water in said vessel with UV light, including at least UV 185 and UV 254;
   c) a sleeve surrounding said UV lamp for receiving a flow of a gas containing oxygen molecules there through to convert some of the oxygen molecules into ozone molecules and produce an ozone enriched gas, wherein the sleeve is transmissive of the UV light including at least UV 185 and UV 254 for irradiating the water in said vessel;
   d) entraining means for entraining the ozone enriched gas in the water flowing into said vessel to simultaneously subject the microorganism to both ozone and UV radiation having wavelengths of at least UV 185 and UV 254; and
   e) a tank for receiving the water containing the microorganism, said entraining means being disposed within said tank and a conduit for conveying the water with entrained ozone to said vessel.

6. The method of claim 1, further comprising:
   d) introducing the water containing *Naegleria fowleri* into a tank;
   e) conveying the water containing *Naegleria fowleri* from the tank to a vessel; and
   f) further conveying the ozone enriched gas to the tank.

7. The Method of claim 6, wherein:
the UV lamp is contained within the vessel;
the step of irradiating water containing *Naegleria fowleri* with UV light from a UV lamp comprises energizing the UV lamp within the vessel to irradiate the water containing *Naegleria fowleri* within the vessel with UV light and subjecting the *Naegleria fowleri* in the water to irradiation with UV lights; and
the step of simultaneously subjecting the *Naegleria fowleri* to ozone by entraining ozone in the water comprises entraining the ozone enriched gas in the water in the tank to subject the microorganism in the water containing *Naegleria fowleri* in the tank and subsequently in the vessel to ozone molecules during irradiation of the water with UV light.

8. The method as set forth in claim 3, wherein:
the water flows into the vessel via a venturi; and
the step of entraining the ozone enriched gas in the water flowing into the vessel comprises drawing the ozone enriched gas into the venturi for entrainment with the water flowing through the venturi.

* * * * *